Patented Feb. 12, 1946

2,394,530

UNITED STATES PATENT OFFICE 2,394,530

AZOMETHINES

Herman A. Bruson and Thomas W. Riener, Philadelphia, Pa., assignors to The Resinous Products & Chemical Company, Philadelphia, Pa., a corporation of Delaware No Drawing. Application January 26, 1944, Serial No. 519,794

8 Claims. (Cl. 260—464)

This invention relates to azomethines of the general formula:

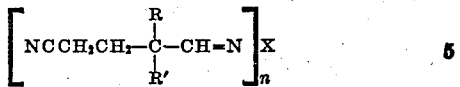

wherein R and R' are hydrocarbon groups, X is an organic radical derived from a primary amine, and $n$ is an integer from one to two, inclusive.

The azomethines of this invention are derived from primary amines and cyanoethylated aldehydes of the formula:

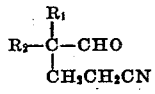

wherein $R_1$ and $R_2$ are hydrocarbon groups. The reaction of such an aldehyde and a primary amine is readily effected from room temperature up to about 150° C. or more. The reaction may be effected by direct mixing of the components, preferably, but not necessarily, in equivalent amounts. If desired, a solvent may be used, such as water, alcohol, benzene, or toluene, and the reaction effected under reflux conditions and the water formed in the reaction removed or separated from any organic solvent.

The cyanoethylated aldehydes which may be used may be obtained by the methods described in United States applications Serial No. 466,050, now issued as United States Patent No. 2,353,687, and a continuation-in-part thereof, Serial No. 488,400, filed May 25, 1943, now issued as United States Patent No. 2,370,006.

In the first of these specifications, aldehydes having two hydrocarbon substituents and one hydrogen atom on the carbon atom in alpha position to the —CHO group are shown to react in the presence of an alkaline catalyst with acrylonitrile to form β-cyanoethylated aldehydes, of which those having two aliphatic hydrocarbon substituents are of particular interest. In the second specification above identified, α,γ-disubstituted crotonaldehydes are shown to react with acrylonitrile rather surprisingly, even though an α-hydrogen atom is lacking. The resulting products are β-cyanoethylated aldehydes having as an α-substituent a hydrocarbon group having an ethnoid linkage between carbon atoms in β-γ position to the —CHO group. It will be evident that β-cyanoethylated aldehydes made by other methods are also operative as long as they are of the type:

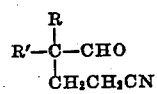

R is generally an alkyl group, such as methyl, ethyl, propyl, isopropyl, butyl, isobutyl, octyl, or the like. R' may be an alkyl group, such as methyl, ethyl, propyl, isopropyl, butyl, isobutyl, amyl, hexyl, octyl, or the like, or an alkenyl group, particularly one having an ethnoid group joined to the central carbon atom to which R' is attached, such as R"CH=CH—, wherein R" is alkyl, such as methyl, ethyl, butyl, octyl, etc., or aralkyl, such as benzyl, butylbenzyl, phenyl ethyl, phenoxyethyl, or the like, or aryl, such as phenyl, methylphenyl, tert.-butyl phenyl, etc., or cycloalkyl, such as cyclohexyl, or methyl-cyclohexyl. R' may also be an unsaturated hydrocarbon group such as butenyl-2 or the like. Any aldehyde having a β-cyanoethyl group and two hydrocarbon substituents on the carbon atom alpha to the carbonyl group appears operative.

For reaction with the above aldehydes, there may be used a primary amine from the aliphatic, cycloaliphatic, arylaliphatic, aromatic, or heterocyclic series. The primary amine may be saturated or unsaturated. It may have in the preferred forms a residue, X, monovalent or bivalent, consisting of carbon and hydrogen. or it may contain in the organic residue substituents such as nitro, sulfonyl, alkoxy, aryloxy, hydroxy, imino, carbalkoxy, or other groups, including halogen groups. Typical primary amines are methylamine, ethylamine, butylamine, amylamine, dodecylamine, octadecylamine, and homologues thereof, allylamine, methallylamine, octadecenylamine, ethanolamine, ethylene diamine, diethylene triamine, triethylene tetramine, butoxyethylamine, diaminodiethyl ether, cyclohexylamine, aniline and the various nuclear chloro, bromo, nitro, methoxy, acetyl, or hydroxy nuclearly substituted anilines, naphthylamines and the various nuclearly substituted derivatives thereof, benzylamine, tetrahydrofurfurylamine, and many other primary amines.

The new azomethines which are formed by reaction of the above aldehydes and primary amines are valuable intermediates for the preparation of pharmaceuticals, insecticides, and plastics. The nitrile group may be reduced to an amine group or hydrolyzed to form amides, acids, salts, and esters. The azomethine group may be hydrogenated to yield a secondary amine group or may be otherwise altered by known reactions. For instance, the new azomethines readily add HCN to form new adipic nitriles disubstituted in a position beta to the added nitrile group.

The following examples are illustrative of the preparation of the azomethines of this invention.

*Example 1*

A mixture of 88.5 grams of aqueous 35% methylamine solution and 86 grams of β-cyanoethyldiethylacetaldehyde was stirred at room temperature for three hours and then heated under a reflux condenser at 40°–45° C. for two and one-quarter hours. After standing overnight, the mixture was washed, the oil layer dried and distilled in vacuo. The base having the formula:

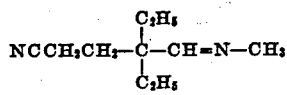

distilled over at 92°–93° C./2 mm. as a colorless oil in a yield of 76.5 grams.

*Example 2*

A mixture of 36.2 grams of 2-cyanoethyl-2-ethylhexaldehyde and 11.4 grams of allylamine was heated one hour on a steam bath. The product was then dried in vacuo at 90° C. and finally distilled under reduced pressure. The product having the formula:

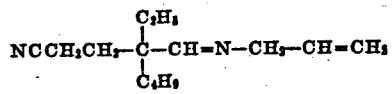

distilled over at 132°–133° C./2.5 mm. as a pale yellow oil in a yield of 30 grams.

*Example 3*

Ethylene diamine (6 grams) was added to 30.6 grams of 2-cyanoethyl-diethylacetaldehyde. Considerable heat was evolved and water separated. The mixture was heated one hour on a steam bath and the water removed by evaporation in vacuo. The residual oil crystallized on standing. The yield was 32 grams. Upon recrystallization from diisobutylene or petroleum ether, the product formed colorless crystals having a melting point of 57°–58° C. and having a composition corresponding to the formula:

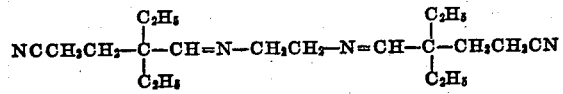

*Example 4*

A mixture of aniline (15.8 grams) and β-cyanoethyl-diethylacetaldehyde (26 grams) was heated for two hours at 95°–100° C., dried and distilled in vacuo. The product having the formula:

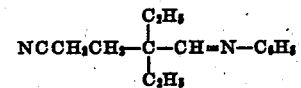

distilled over at 170°–180° C./2–3 mm. as a pale yellow oil.

*Example 5*

One molecular equivalent each of n-butylamine and 2-ethyl-2-(β-cyanoethyl)-3-hexenal-1 were heated for one hour at 100° C. and the reaction product distilled in vacuo. The product having the formula:

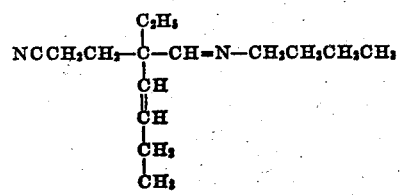

distilled at 130°–133° C./1 mm. as a pale yellow oil.

In a similar manner, the following products were obtained by heating reacting proportions of the aldehydes and amines indicated in the table below. The reaction with methylamine was carried out at 30° to 65° C., while the other reactions were effected at steam bath temperatures of 90°–100° C.

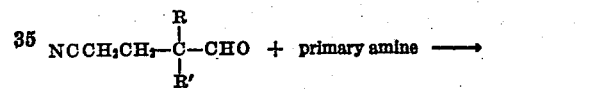

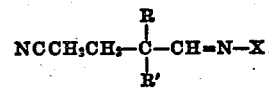

| R | R' | Amine | Time (hours) | Boiling point of product, °C. |
|---|---|---|---|---|
| Ethyl | n-Butyl | Methylamine | 3 | 109°–114°/2 mm. |
| Do | do | n-Butylamine | 1 | 133°–137°/1 mm. |
| Do | do | n-Octadecylamine | 3 | 235°–244°/2 mm. |
| Do | do | Cyclohexylamine | 1 | 140°–145°/1 mm. |
| Do | do | Ethylene diamine | 1 | 235°–241°/2 mm. |
| Do | do | Diethylene triamine | 1 | 240°–245°/2 mm. |
| Do | do | Aniline | 2 | 175°–185°/1 mm. |
| Do | do | p-Chloraniline | 3 | 199°–202°/2 mm. |
| Do | do | Benzylamine | 1 | 180°–187°/3 mm. |
| Do | CH₃CH₂CH=CH | Allylamine | 1 | 125°–130°/1 mm. |

We claim:

1. An azomethine of the formula:

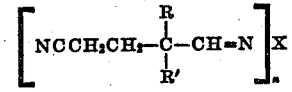

wherein R and R' are aliphatic hydrocarbon groups, X is a hydrocarbon radical, and $n$ is an integer having a value of one to two, inclusive.

2. An azomethine of the formula:

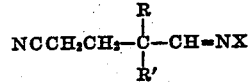

wherein R and R' are aliphatic hydrocarbon groups and X is a monovalent hydrocarbon radical.

3. An azomethine of the formula:

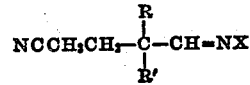

wherein R and R' are alkyl groups and X is a monovalent hydrocarbon radical.

4. An azomethine of the formula:

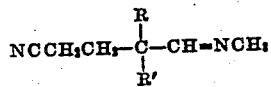

wherein R and R' are alkyl groups.

5. An azomethine of the formula:

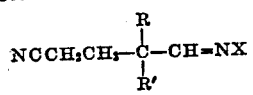

wherein R is an alkyl group and R' is a hydrocarbon group containing an ethnoid group joined to the carbon atom to which the group R' is attached and X is a monovalent hydrocarbon group.

6. A compound of the formula:

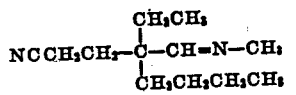

7. A compound of the formula:

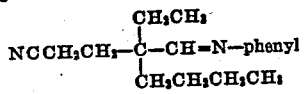

8. A compound of the formula:

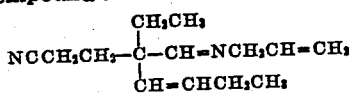

HERMAN A. BRUSON.
THOMAS W. RIENER.